US011395011B2

(12) United States Patent
Livshitz et al.

(10) Patent No.: US 11,395,011 B2
(45) Date of Patent: *Jul. 19, 2022

(54) COORDINATED PIECEWISE BEZIER VECTORIZATION

(71) Applicant: Evernote Corporation, Redwood City, CA (US)

(72) Inventors: Eugene Livshitz, San Mateo, CA (US); Ilia Buriak, Moscow (RU); Natalia Galaktionova, Mytishchi (RU); Alexander Pashintsev, Cupertino, CA (US); Boris Gorbatov, Sunnyvale, CA (US)

(73) Assignee: EVERNOTE CORPORATION, Redwood City, CA (US)

( * ) Notice: Subject to any disclaimer, the term of this patent is extended or adjusted under 35 U.S.C. 154(b) by 26 days.

This patent is subject to a terminal disclaimer.

(21) Appl. No.: 16/989,733

(22) Filed: Aug. 10, 2020

(65) Prior Publication Data

US 2021/0029382 A1 Jan. 28, 2021

Related U.S. Application Data

(63) Continuation of application No. 16/279,856, filed on Feb. 19, 2019, now Pat. No. 10,743,035, which is a (Continued)

(51) Int. Cl.
*G06K 9/00* (2022.01)
*H04N 19/94* (2014.01)
(Continued)

(52) U.S. Cl.
CPC ............. *H04N 19/94* (2014.11); *G06T 3/403* (2013.01); *G06T 3/4023* (2013.01); *G06T 5/007* (2013.01);
(Continued)

(58) Field of Classification Search
CPC ....... H04N 19/94; G06T 3/4023; G06T 3/403; G06T 5/007; G06T 5/20; G06T 7/12; G06T 7/60; G06T 11/203
See application file for complete search history.

(56) References Cited

U.S. PATENT DOCUMENTS 5,091,976 A * 2/1992 Murayama ................ G06T 9/20
358/1.9
5,115,479 A * 5/1992 Murayama .............. G06F 17/17
382/241

(Continued)

OTHER PUBLICATIONS

Vectorization of hand drawn image—curve fitting., Hung-Hsin Chang et al., Pergamom, PII: S0031-3203(98)00045-4, 1998, pp. 1747-1755 (Year: 1998).*

(Continued)

*Primary Examiner* — Jayesh A Patel
(74) *Attorney, Agent, or Firm* — Morgan, Lewis & Bockius LLP (57) ABSTRACT

This application is directed to vectoring a raster image in which an electronic device detects a contour of a component in the raster image, builds tangent vectors for each point of the contour and identifies a plurality of segmentation points on the contour. One or more points of sharp angle are identified on the contour in accordance with a determination that each point of sharp angle corresponds to two distinct tangent vectors and that an angle between the two distinct tangent vectors falls below a predefined threshold. A respective one of the segmentation points is positioned at each identified point of shape angle. The electronic device approximates a piecewise smooth fitting curve (e.g., a piecewise Bezier curve) having two or more fitting segments to connect the plurality of segmentation points on the contour. The piecewise smooth fitting curve is thereby provided to vectorize the raster image.

20 Claims, 4 Drawing Sheets

Related U.S. Application Data continuation of application No. 15/349,543, filed on Nov. 11, 2016, now Pat. No. 10,212,457.

(60) Provisional application No. 62/256,332, filed on Nov. 17, 2015.

(51) Int. Cl.
| | |
|---|---|
| *G06T 3/40* | (2006.01) |
| *G06T 5/00* | (2006.01) |
| *G06T 5/20* | (2006.01) |
| *G06T 7/60* | (2017.01) |
| *G06T 11/20* | (2006.01) |
| *G06T 7/12* | (2017.01) |

(52) U.S. Cl.
CPC .................. *G06T 5/20* (2013.01); *G06T 7/12* (2017.01); *G06T 7/60* (2013.01); *G06T 11/203* (2013.01)

(56) References Cited

U.S. PATENT DOCUMENTS

| | | | | |
|---|---|---|---|---|
| 5,233,671 | A * | 8/1993 | Murayama | G06T 9/20 358/1.9 |
| 5,329,381 | A * | 7/1994 | Payne | B33Y 50/00 358/463 |
| 5,734,756 | A * | 3/1998 | Sherman | G06T 11/203 382/259 |
| 5,934,959 | A * | 8/1999 | Inman, Sr. | B63H 21/34 440/89 R |
| 6,100,998 | A * | 8/2000 | Nagao | G06K 15/02 358/1.9 |
| 6,226,400 | B1 * | 5/2001 | Doll | G06T 7/12 382/163 |
| 6,300,955 | B1 * | 10/2001 | Zamir | G06T 7/194 382/175 |
| 7,868,887 | B1 * | 1/2011 | Yhann | G06T 11/203 345/442 |
| 7,986,331 | B1 * | 7/2011 | Meridian | G06F 3/04847 345/619 |
| 9,727,784 | B2 * | 8/2017 | Grodecki | G06V 20/13 |
| 10,212,457 | B1 * | 2/2019 | Livshitz | G06T 7/60 |
| 10,743,035 | B2 * | 8/2020 | Livshitz | G06T 5/20 |
| 2005/0007369 | A1 * | 1/2005 | Cao | G06T 11/20 345/442 |
| 2005/0147312 | A1 * | 7/2005 | Chen | G06V 10/469 382/242 |
| 2005/0238244 | A1 * | 10/2005 | Uzawa | G06T 9/20 382/242 |
| 2006/0171592 | A1 * | 8/2006 | Amico | G06V 10/469 356/601 |
| 2009/0027398 | A1 * | 1/2009 | Frisken | G06T 11/203 345/442 |
| 2009/0074302 | A1 * | 3/2009 | Kishi | G06V 10/46 382/224 |
| 2009/0141038 | A1 * | 6/2009 | Newaskar | G06T 11/203 345/589 |
| 2012/0051655 | A1 * | 3/2012 | Oto | G06T 9/001 382/199 |

OTHER PUBLICATIONS

Vectorization of raster image using B-Spline surfaces, Curtis A. Armstrong, BYU Scholars archive, Jul. 2006, pp. 1-157 (Year: 2006).*

* cited by examiner

COORDINATED PIECEWISE BEZIER VECTORIZATION

CROSS-REFERENCE TO RELATED APPLICATIONS

This application is a continuation of and claims priority to U.S. patent application Ser. No. 16/279,856, filed Feb. 19, 2019, titled "Coordinated Piecewise Bezier Vectorization," which is a continuation of and claims priority to U.S. patent application Ser. No. 15/349,543, filed Nov. 11, 2016, titled "Coordinated Piecewise Bezier Vectorization," which claims priority to U.S. Provisional Patent Application No. 62/256,332, filed Nov. 17, 2015, and entitled "Coordinated Piecewise Bezier Vectorization," each of which is incorporated by reference by its entirety.

TECHNICAL FIELD

This application is directed to the field of image processing, and more particularly to the field of approximation of contours in raster images with an optimally segmented Bezier curve.

BACKGROUND OF THE INVENTION

Mobile phones with digital cameras are broadly available in nearly every worldwide market. According to market statistics and forecasts, by 2018, annual smartphone shipments are expected to grow to 1.87 billion units; over 80% of all mobile phones will be arriving to customers with embedded digital cameras. New shipments will expand the already massive current audience of approximately 4.5 billion mobile phone users and seven billion mobile subscribers; new units will also update mobile phones currently used by the subscribers. Annual sales of phone cameras to mobile phone manufacturers for embedding into smartphones and feature phones are projected at 1.5 billion units.

The volume of photographs taken with phone cameras is also growing rapidly. According to recent survey by Pew Research, photographing with phone cameras is the single most popular activity of smartphone owners utilized by 82% of users. According to recent studies, about 27% of all photos have been taken with smartphones. Images from smartphone cameras are more and more dominating social photo sharing sites.

Hundreds of millions smartphone users are increasingly incorporating smartphone cameras into their information capturing and processing lifestyles at work and at home. Digitizing and capturing paper based information becomes ubiquitous. A recent survey of smartphone usage by millennials has revealed that 68% of survey respondents have been introduced to mobile information capturing via mobile check deposits and 83% think that mobile capture will be part of all mobile transactions within the next five years. Additionally, business oriented users are capturing meeting materials and notes from whiteboards, Moleskine and other paper notebooks and other handwritten media. A 2015 study of corporate whiteboard users has discovered that 84% of survey participants experienced a need to store whiteboard content; accordingly, 72% had taken a photograph of a whiteboard at least once, while 29% had at least 10 images of whiteboards saved on their camera enabled smartphones or tablet s. The arrival of unified multi-platform content management systems, such as the Evernote service and software developed by Evernote Corporation of Redwood City, Calif., aimed at capturing, storing, displaying and modifying all types and formats of information across all user devices, has facilitated and stimulated capturing of typed and handwritten text, documents, forms, checks, charts, drawings and other types and formats of real-life content with smartphone cameras, as well as other types of cameras and scanners.

Content captured by users using smartphone and other cameras or scanners is initially stored in a content management system as a raster image. Users can view and share such content, but object based processing—selective text modification or copy-pasting, operations with handwritten doodles or charts, etc.—is not instantly available. In response to this challenge, a variety of content vectorization mechanisms and systems have been developed, including Roberts, Canny and Sobel edge detection methods, Potrace and Vextractor vectorization software, etc. These mechanisms aim at converting image content into line art and other traceable object collections.

Notwithstanding a significant progress in vectorization technologies, existing algorithms suffer from significant discrepancies between an original image and a vector representation of the original image. For example, Bezier curves that are broadly used in vectorization are often applied inconsistently and distort characteristic features of handwritten, typed and hand-drawn shapes, such as sharp angles and high curvature pieces of a trajectory, which especially affects vectorization accuracy and processing capabilities for artistic hand-drawn and printed images.

Accordingly, it is useful to develop efficient and accurate mechanisms for vectorization of content captured on raster images.

SUMMARY OF THE INVENTION

According to the system described herein, vectorizing a raster image includes identifying a connectivity component in the raster image, detecting a contour of the connectivity component, building tangent vectors for each point of the contour, for each sharp angle of the contour, positioning a segmentation point of two segments at a point thereof, for each location of high curvature of the contour, positioning segments proximal thereto, composing an optimization task to approximate a piecewise Bezier curve, solving the optimization task to provide a vectorization of the raster image, and, in response to there not being a sufficient number of segments, adding additional segments. Vectorizing a raster image may also include applying perspective, color, brightness and contrast correction to the raster image and building a binary black-white representation of the raster image prior to identifying the connectivity component. The optimization task may minimize a root-mean square deviation of the piecewise Bezier curve and may provide continuity and smooth conjugation of adjacent ones of segments of the piecewise Bezier curve that are not segments corresponding to sharp angles of the contour. There not being a sufficient number of segments may be determined by the deviation of the piecewise Bezier curve exceeding a predefined threshold. The predefined threshold may correspond to a root mean square of the deviation being greater than two pixels. The optimization task may be provided using the formula:

$$\sum_{i,j} \|B(t_j^i) - C(t_j^i)\|^2 + \sum_i^1 \left\| \frac{\partial B(t_n^i)}{\partial t} - \frac{\partial B(t_1^{i+1})}{\partial t} \right\|^2 \to \min$$

where $\|\cdot\|$ is a Euclidean distance, $t_j^i$ is a j-th count of an i-th segment of the contour, $t_n^i$ is a symbolic notation for a last count of an i-th segment and $t_1^{i+1}$ is a symbolic notation for a first count of a next i+l-st segment, and $B(t_j^i)$, $C(t_j^i)$, $$\frac{\partial B(t)}{\partial t}$$

are respectively coordinates on an i-th segment of the Bezier curve, an i-th segment of the contour, and tangent vectors at ends and beginnings of segments of the piecewise Bezier curve that are not segments corresponding to sharp angles of the contour. The optimization task may be solved using a banded matrix corresponding to a system of linear equations. A sharp angle may be determined by the presence of two distinct left and right tangent vectors where an angle between the two vectors falls below a predefined threshold. The predefined threshold may correspond to an angle between the left tangent vector and the right tangent vector being less than ninety degrees. Each location of high curvature may be determined by a change of direction of the tangent vector within the location exceeding a predefined threshold. The predefined threshold may correspond to an angle between two tangent vectors that are twenty pixels apart being greater than 90 degrees. The raster image may be captured and vectorized using a mobile device.

According further to the system described herein, a non-transitory computer-readable medium contains software that vectorizes a raster image. The software includes executable code that identifies a connectivity component in the raster image, executable code that detects a contour of the connectivity component, executable code that build tangent vectors for each point of the contour, executable code that, for each sharp angle of the contour, positions a segmentation point of two segments at a point thereof, executable code that, for each location of high curvature of the contour, positions segments proximal thereto, executable code that composes an optimization task to approximate a piecewise Bezier curve, executable code that solves the optimization task to provide a vectorization of the raster image, and executable code that, in response to there not being a sufficient number of segments, adds additional segments. The software may also include executable code that applies perspective, color, brightness and contrast correction to the raster image and building a binary black-white representation of the raster image prior to identifying the connectivity component. The optimization task may minimize a root-mean square deviation of the piecewise Bezier curve and may provide continuity and smooth conjugation of adjacent ones of segments of the piecewise Bezier curve that are not segments corresponding to sharp angles of the contour. There not being a sufficient number of segments may be determined by the deviation of the piecewise Bezier curve exceeding a predefined threshold. The predefined threshold may correspond to a root mean square of the deviation being greater than two pixels. The optimization task may be provided using the formula:

$$\sum_{i,j}\|B(t_j^i)-C(t_j^i)\|^2 + \sum_i^1 \left\|\frac{\partial B(t_n^i)}{\partial t} - \frac{\partial B(t_1^{i+1})}{\partial t}\right\|^2 \to \min$$

where $\|\cdot\|$ is a Euclidean distance, $t_j^i$ is a j-th count of an i-th segment of the contour, $t_n^i$ is a symbolic notation for a last count of an i-th segment and $t_1^{i+1}$ is a symbolic notation for a first count of a next i+l-st segment, and $B(t_j^i)$, $C(t_j^i)$, $$\frac{\partial B(t)}{\partial t}$$

are respectively coordinates on an i-th segment of the Bezier curve, an i-th segment of the contour, and tangent vectors at ends and beginnings of segments of the piecewise Bezier curve that are not segments corresponding to sharp angles of the contour. The optimization task may be solved using a banded matrix corresponding to a system of linear equations. A sharp angle may be determined by the presence of two distinct left and right tangent vectors where an angle between the two vectors falls below a predefined threshold. The predefined threshold may correspond to an angle between the left tangent vector and the right tangent vector being less than ninety degrees. Each location of high curvature may be determined by a change of direction of the tangent vector within the location exceeding a predefined threshold. The predefined threshold may correspond to an angle between two tangent vectors that are twenty pixels apart being greater than 90 degrees. The raster image may be captured and vectorized using a mobile device.

The proposed system builds a coordinated piecewise Bezier approximation of each contour (boundary) of a connectivity component of a raster image using pre-processing of the contour to define segmentation of the contour taking into account sharp angles and points of high curvature and using a global optimization function that reflects both the closeness of each Bezier segment to the original contour and a smooth conjugation of adjacent Bezier segments.

System functioning starts with an initial step of pre-processing a raster image where perspective, color, brightness and contrast correction are applied to the image and a binary black-white representation of the image is built. At a next pre-processing step, connectivity components of the binary image are identified and boundaries (contours) of the connectivity components are retrieved using any of a number of conventional techniques. Each contour is subject to vectorization by the system, which is performed as follows:

1. Left and right tangent vectors are built for each point of the contour (with due respect to quantization step of the curve). For points where the trajectory is smooth, the left and right vectors coincide. Divergence of the left and right tangent vectors is an indicator of an angle along the contour.
2. All relatively sharp angles on the contour are detected and serve as initial segmentation points for a piecewise Bezier approximation. In an embodiment, a sharp angle may be specified as a point on the trajectory where the left and right tangent vectors are distinct and form an angle less than 90 degrees.
3. Additional points of high curvature of the contour (small curvature radius but no sharp angle) are identified. For each identified point, an additional Bezier segment is designated by placing two extra segmentation points around the identified point between the identified point and a previously detected segmentation points from step 2. In an embodiment, curvature of the contour may be measured in each point of the contour as follows:
   a. A 10-pixel interval is taken in each direction from the point.

b. Rotation of the tangent vector between the ends of the two intervals is measured as a change in direction of the tangent vector.
c. If the change in direction is large enough, for example, larger than 90 degrees, the point is considered a high curvature point of the contour.
4. If a number of segmentation points on the contour is insufficient (for example, a long contour has just three segmentation points defined at steps 2, 3), additional segmentation points may be designated on the contour, for example, to split long portions of the contour that lack segment at ion points from steps 2,3, into segments of roughly equal lengths. In an embodiment, addition of new segments may be driven by an approximation accuracy of the solution of the global optimization task, as explained below.
5. A global optimization task of approximation of the contour by a piecewise Bezier curve, one Bezier curve per segment, is formulated and solved. The task is defined by an objective function that takes into account three factors:
    a. Minimization of the root-mean-square deviation of the piecewise Bezier curve from the contour.
    b. Continuity of piecewise Bezier approximation—the end point of each segment is the same a starting point of the next segment.
    c. Smooth conjugation of adjacent segments at each segmentation point, except for angles detected at step 2 (minimization of deviation between tangent vectors at an end of a segment and a start of the next segment).

Based on the above, an objective function may be presented as follows:

$$\sum_{i,j} \|B(t_j^i) - C(t_j^i)\|^2 + \sum_i^1 \left\| \frac{\partial B(t_n^i)}{\partial t} - \frac{\partial B(t_1^{i+1})}{\partial t} \right\|^2 \to \min$$

where $\|\bullet\|$ is a Euclidean distance; $t_j^i$ is a j-th count of an i-th segment of the contour; in particular, $t_n^i$ is a symbolic notation for a last count of an i-th segment and $t_1^{i+1}$ is a symbolic notation for a first count of a next i+1-st segment; $B(t_j^i)$, $C(t_j^i)$, $$\frac{\partial B(t)}{\partial t}$$

are respectively coordinates on an i-th segment of the Bezier curve, an i-th segment of the contour, and tangent vectors at ends and beginnings of Bezier segments.

It should be noted that because of task segmentation, segment-by-segment task composition and adjacency of coordinated segments of the Bezier curve, a matrix of a system of linear equations that solve a minimization task has a banded structure and allows for a quick solution even for a high-dimensional task with a large number of segments on the original contour and the corresponding Bezier curve.

After the optimization task is solved, the quality of approximation of the contour by Bezier segments and the smoothness of conjugation of the segments may be additionally evaluated; if any of the quality indicators are insufficient, more segmentation points may be added and a new approximation step with a modified objective function that includes more segments may be conducted. In an embodiment, new segments may be added if the root mean square of the deviation is greater than two pixels.

BRIEF DESCRIPTION OF THE DRAWINGS

Embodiments of the system described herein will now be explained in more detail in accordance with the figures of the drawings, which are briefly described as follows.

DETAILED DESCRIPTION OF VARIOUS EMBODIMENTS

The system described herein provides a mechanism for building high quality vector representations of raster images by using piecewise Bezier approximation of each contour on the original image with coordinated segment geometry designed to optimize characteristic points on the contour, such as sharp angles, non-angular points of high curvature, etc.

Figure 1:
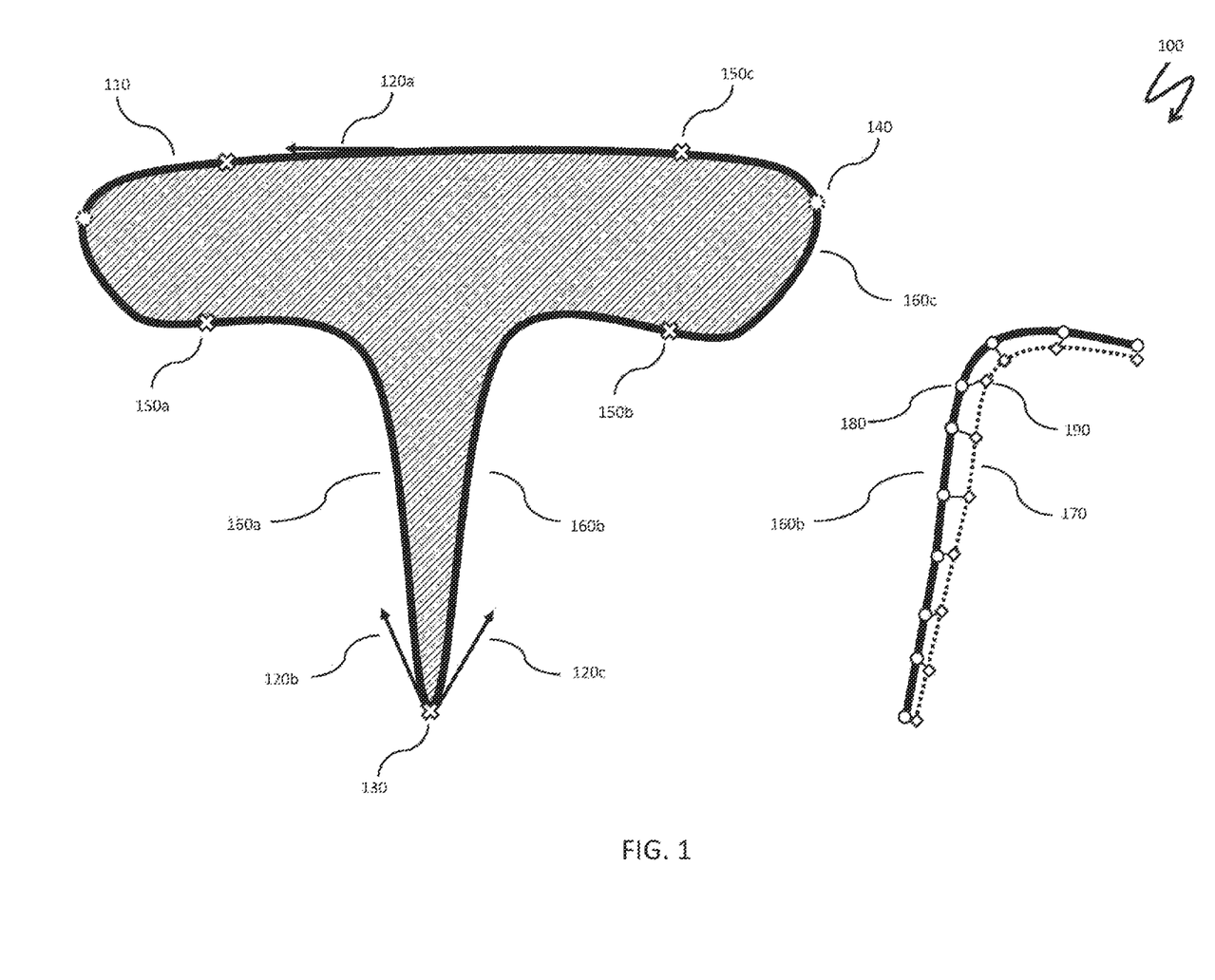
FIG. 1 is a schematic illustration of segmentation of a contour on a raster image, according to embodiments of the system described herein.

FIG. 1 is a schematic illustration 100 of segmentation of a contour on a raster image. A contour 110 corresponds to a connectivity component on a raster image, as explained elsewhere herein. The contour 110 is supplied with tangential vectors built along the contour 110, exemplified by a vector 120*a* for a point of low curvature and two vectors 120*b*, 120*c* built for a sharp angle 130 where the continuity of the tangential vector field may be breaking, so that a particular point on the contour may have a pair of tangential vectors (for a conventional counter-clockwise direction on the contour, the tangential vector 120*b* is a left tangential vector, while 120*c* is a right tangential vector.

Another type of characteristic points on the contour 110 detected by the system corresponds to points of relatively high curvature 140. After all characteristic points on the contour 110 have been identified by the system, segmentation points are added; as explained elsewhere herein, segmentation points may represent sharp angles on the contour and may surround points of high curvature. Segmentation points illustrated in FIG. 1 are points 150*a*, 150*b*, 150*c* and includes a point at the sharp angle 130. Subsequently, three sample segments on the contour 110 may be denoted as a segment 160*a* (between the segmentation point 150*a* and the point at the sharp angle 130), a segment 160*b* (between the point at the sharp angle 130 and the segmentation point 150*b*) and a segment 160*c* (between the segmentation points 150*b*, 150*c*).

A projection of the segment 160*b* is shown separately in FIG. 1, paired with a Bezier segment 170 used to build a vector approximation of the contour 110, as explained elsewhere herein. Additionally, several points 180 along the segment 160*b* of the contour 110 and corresponding points 190 on the Bezier segments 170 are shown.

Figure 2:
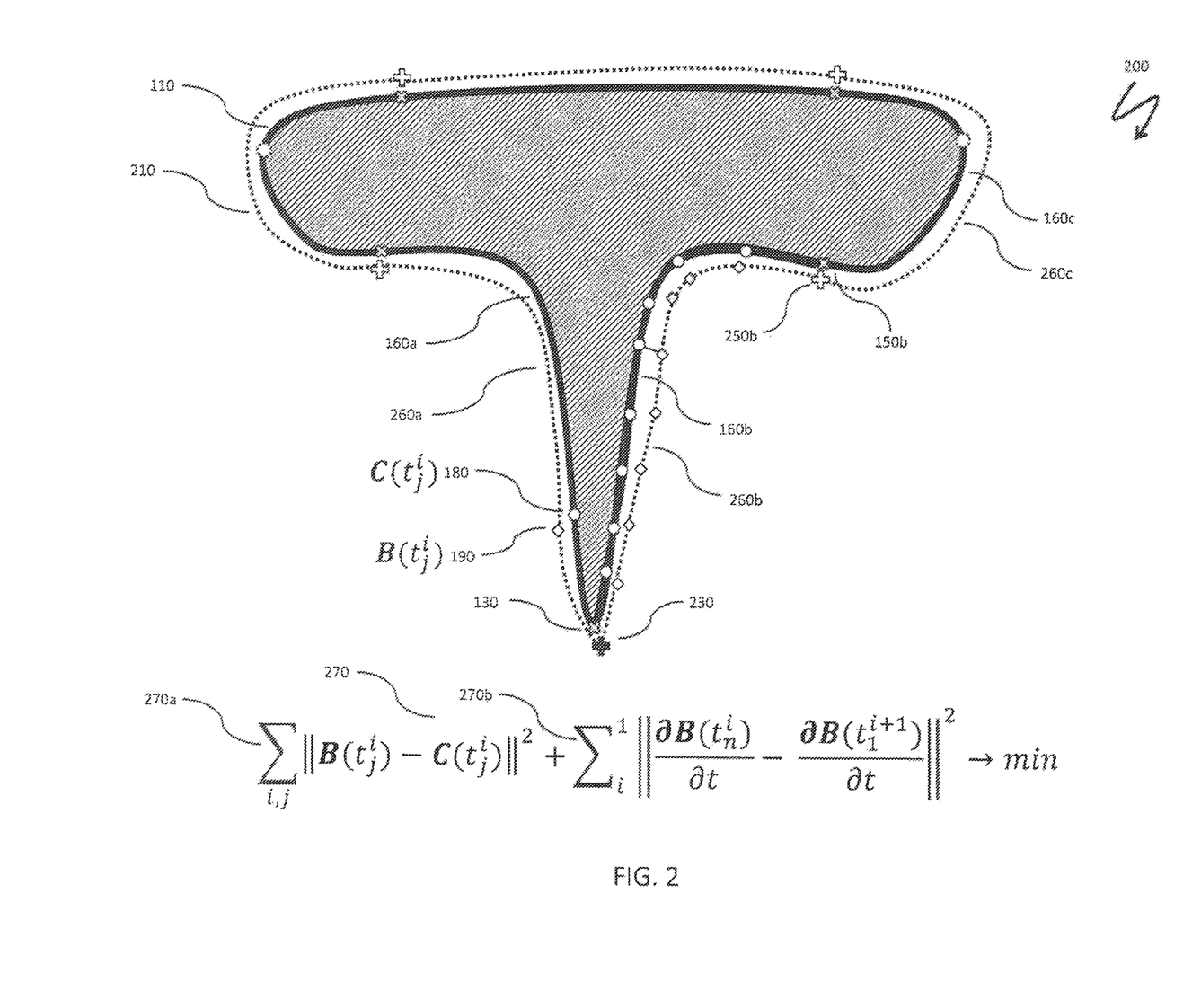
FIG. 2 is a schematic illustration of optimization of a piecewise Bezier approximation, according to embodiments of the system described herein.

FIG. 2 is a schematic illustration 200 of optimization of a piecewise Bezier approximation. The contour 110 is approximated by a segmented Bezier curve 210, so that the segments 160a, 160b, 160c are approximated by corresponding Bezier segments 260a, 260b, 260c. Additional ones of original and approximating segments are depicted in FIG. 2, but aren't enumerated. Accordingly, original segmentation points, such as the point at the sharp angle 130 and the point 150b (i.e. the beginning and the end of the original segment 160b) obtain analogs corresponding to segmentation points on the Bezier curve 210, such as points 230, 250b shown in FIG. 2.

Using notations $C(t_j^i)$ for the points 180 of the contour 110 and $B(t_j^i)$ for the points 190 on the corresponding Bezier curve 210 (a j-th count of an i-th segment), an optimization task 270 may be formulated. A first sum 270a applies to all points of every segment, while a second sum 270b (with the superscript 1) applies only to smooth conjugations of adjacent segments, such as at the point 250b; sharp angles, such as the point 230, are excluded (shown by a black filling of a corresponding cross mark).

Figure 3:
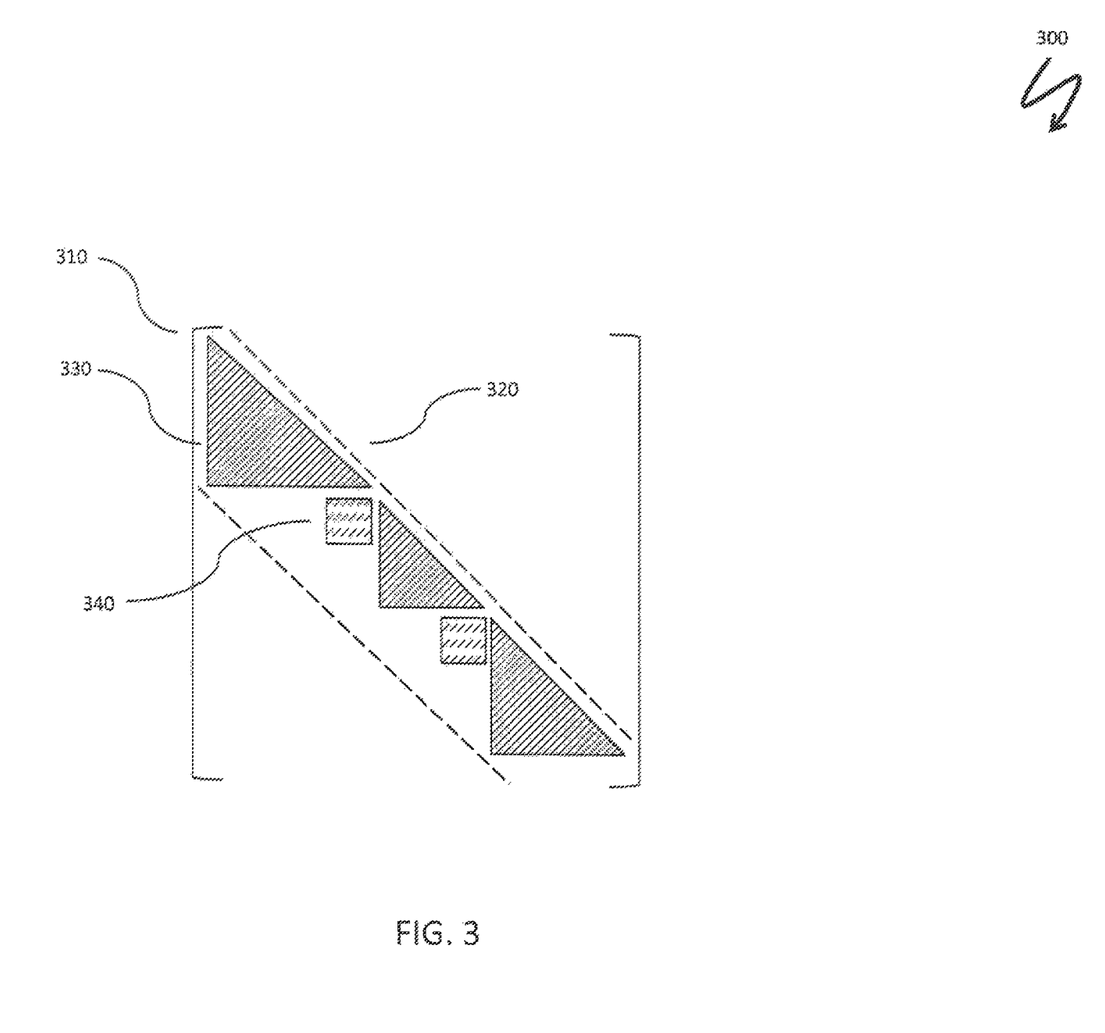
FIG. 3 is a schematic illustration of a banded matrix for a system of linear equations for the optimization task, according to embodiments of the system described herein.

FIG. 3 is a schematic illustration 300 of a banded matrix 310 for a system of linear equations for an optimization task. The matrix 310 of the system of linear equations is symmetric (so that only elements below a diagonal of the matrix are shown) and is contained within a relatively narrow band 320 containing triangles 330 and rectangles 340. Each of the triangles 330 represents an approximation of an original segment by a corresponding Bezier segment, i.e. the segments included in the sum 270a in FIG. 2. Each of the rectangles 330 represents a point of smooth conjugation between two adjacent segments of the Bezier curve, such as the point 250b in FIG. 2; the rectangles 340 correspond to the sum 270b in FIG. 2.

Figure 4:
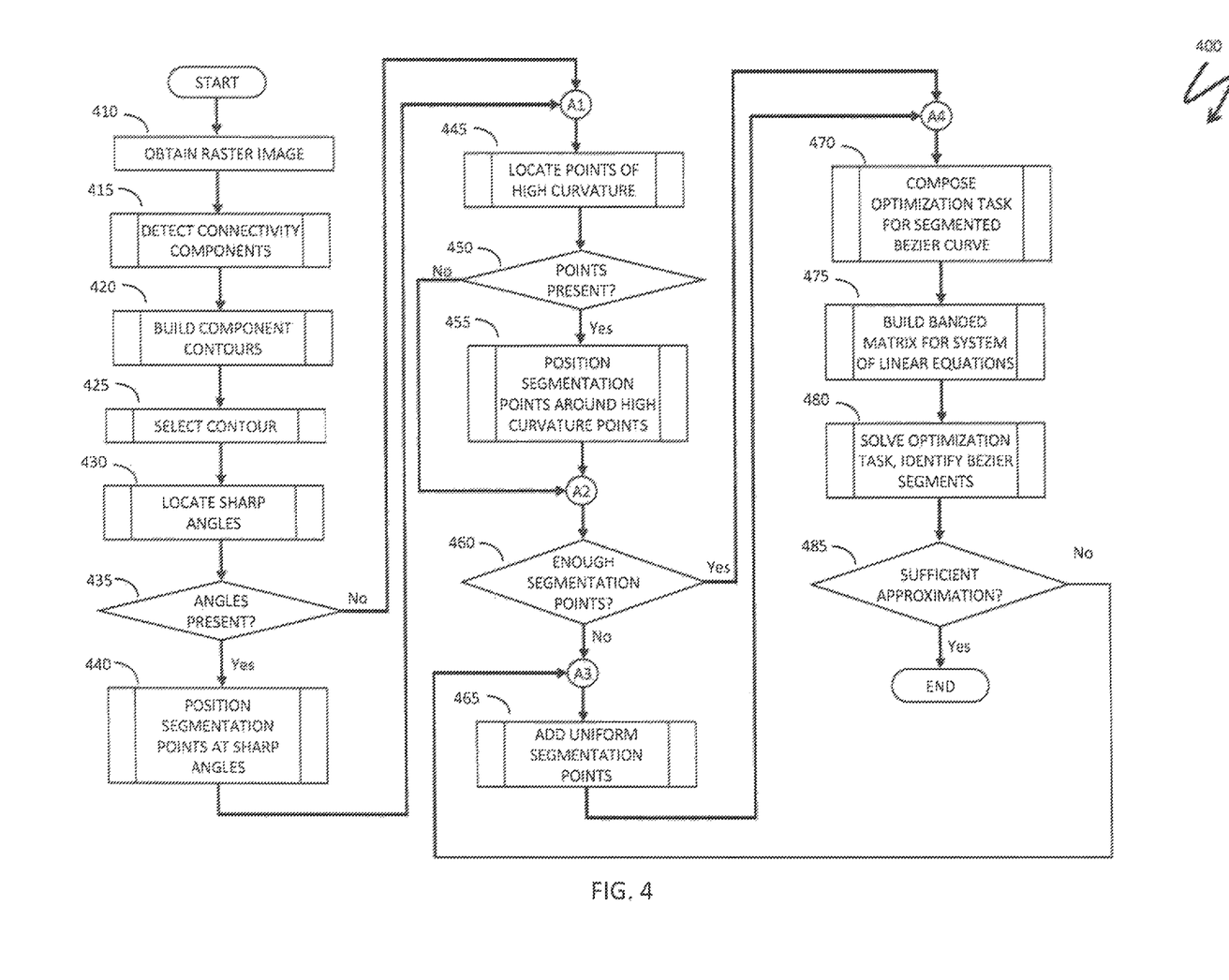
FIG. 4 is a system flow diagram illustrating processing performed in connection with coordinated piecewise Bezier vectorization, according to embodiments of the system described herein.

Referring to FIG. 4, a flow diagram 400 schematically illustrates processing performed in connection with coordinated piecewise Bezier vectorization. In an embodiment herein, processing illustrated by the flow diagram 400 may be provided using a mobile device, such as a mobile phone, that may or may not have been used to capturing an image on which piecewise Bezier vectorization is performed. Processing starts at a step 410 where a raster image is obtained. After the step 410, processing proceeds to a step 415, where the system detects connectivity components on the image. After the step 415, processing proceeds to a step 420, where the system builds contours for each connectivity component. After the step 420, processing proceeds to a step 425, where a contour is selected. The remainder of the flow diagram 400 describes the processing in connection with the single chosen contour.

After the step 425, processing proceeds to a step 430, where the system locates sharp angles on the contour (see, for example, FIG. 1 and the accompanying text related to the point at the sharp angle 130). After the step 430, processing proceeds to a test step 435, where it is determined whether any sharp angles are present. If so, processing proceeds to a step 440 where segmentation points of the original contour are positioned at points of the sharp angles. After the step 440, processing proceeds to a step 445, where the system locates points of high curvature on the original contour, as explained elsewhere herein. Note that the step 445 may be independently reached from the test step 435 in the event when there are no sharp angles on the contour.

After the step 445, processing proceeds to a test step 450, where it is determined whether any high curvature points are present. If so, processing proceeds to a step 455 where segmentation points of the contour are augmented with additional points positioned around high curvature point s, as explained elsewhere herein. After the step 455, processing proceeds to a test step 460, where it is determined whether there are enough segmentation points on the contour. Note that the test step 460 may be independently reached from the test step 450 if no high curvature points were present on the con tour. If there are not enough segmentation point s on the contour, processing proceeds to a step 465 where uniform segmentation point s are added along the contour. After the step 465, processing proceeds to a step 470 where an optimization task for identifying a segmented Bezier curve is composed, as explained elsewhere herein (see, in particular, FIG. 2 and the accompanying text).

After the step 470, processing proceeds to a step 475 where a banded matrix for the system of linear equations representing the optimization task is built (depicted in FIG. 3 and explained in the accompanying text). After the step 475, processing proceeds to a step 480 where the optimization task is solved and coordinated Bezier segments are identified. After the step 480, processing proceeds to a test step 485, where it is determined whether the approximation of the original contour is sufficient. If so, processing is complete; otherwise, processing proceeds back to the step 465 to add more segmentation points.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, elements and areas of screen described in screen layouts may vary from the illustrations presented herein. Further, various aspects of the system described herein may be implemented using soft war e, hardware, a combination of software and hardware and/or other computer-implemented modules or devices having the described features and performing the described functions. Capturing of raster images may be done using smartphones, tablets and other mobile devices with embedded cameras, as well as conventional cameras, scanners and other hardware.

Software implementations of the system described herein may include executable code that is stored in a computer readable medium and executed by one or more processors, including one or more processors of a desktop computer. The desktop computer may receive input from a capturing device that may be connected to, part of, or otherwise in communication with the desktop computer. The desktop computer may include software that is pre-loaded with the device, installed from an app store, installed from media such as a CD, DVD, etc., and/or downloaded from a Web site. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of vectorizing a raster image, comprising:
at an electronic device including one or more processors and memory:

detecting a contour of a component in the raster image;
building tangent vectors for a plurality of individual points on the contour;
identifying a plurality of segmentation points on the contour, the plurality of segmentation points including two first segmentation points, including:
identifying a location of high curvature in accordance with a determination that a change of direction of the tangent vectors associated with the location of high curvature exceed a first predefined threshold; and
positioning two first segments proximal to the location of high curvature for connecting the location of high curvature to the two first segmentation points on the contour;
approximating a piecewise smooth fitting curve to connect the plurality of segmentation points on the contour, the piecewise smooth fitting curve including two or more fitting segments each of which is configured to connect two neighboring points of the plurality of segmentation points; and
in accordance with the piecewise smooth fitting curve, providing a vectorization of the raster image.

2. The method of claim 1, wherein the first predefined threshold corresponds to an angle between two tangent vectors of points on each location of high curvature that are twenty pixels apart.

3. The method of claim 1, wherein the change of direction of the tangent vectors associated with the location of high curvature corresponds to an angle, and the first predefined threshold is equal to 90 degrees, and wherein the location of high curvature is identified in accordance with a determination that the angle exceeds 90 degrees.

4. The method of claim 1, wherein the plurality of segmentation points including one or more second segmentation points, and identifying the plurality of segmentation points on the contour further comprises:
identifying one or more points of sharp angle on the contour in accordance with a determination that each of the one or more points of sharp angle has two distinct left and right tangent vectors originating from the respective point of sharp angle and that an angle between the two distinct left and right tangent vectors of each of the one or more points of sharp angle falls below a second predefined threshold; and
positioning a respective one of the one or more second segmentation points at each identified point of sharp angle, each point of sharp angle connecting two second segments on the contour.

5. The method of claim 1, further comprising:
in accordance with a determination that the piecewise smooth fitting curve does not match the contour, adding one or more segmentation points to create additional segments.

6. The method of claim 5, further comprising:
determining that the piecewise smooth fitting curve does not match the contour in accordance with a determination determining a deviation of the piecewise smooth fitting curve from the contour exceeds a predefined deviation threshold.

7. The method of claim 6, wherein the predefined deviation threshold corresponds to a root mean square of the deviation of the piecewise smooth fitting curve being greater than two pixels.

8. The method of claim 1, further comprising:
minimizing a root-mean square deviation of the piecewise smooth fitting curve from the contour; and
providing continuity and smooth conjugation of adjacent ones of the fitting segments, of the piecewise smooth fitting curve, that are not connected to any point of sharp angle on the contour.

9. The method of claim 1, further comprising:
providing a root-mean square deviation of the piecewise smooth fitting curve from the contour, wherein the root-mean square deviation is minimized using a formula of:

$$\sum_{i,j} \|B(t_j^i) - C(t_j^i)\|^2 + \sum_i \left\| \frac{\partial B(t_n^i)}{\partial t} - \frac{\partial B(t_1^{i+1})}{\partial t} \right\|^2 \to \min$$

where $\|\cdot\|$ is a Euclidean distance,
t is a pixel count on a segment of the contour,
$t_j^i$ is a j-th count of an i-th segment of the contour,
$t_n^i$ is a symbolic notation for a last count of an i-th segment and $t_1^i+1$ is a symbolic notation for a first count of a next i+1-st segment, and
$B(t_j^i)$, $C(t_j^i)$, $$\frac{\partial B(t)}{\partial t}$$

are respectively coordinates on an i-th segment of the smooth fitting curve, an i-th segment of the contour, and tangent vectors at ends and beginnings of segments of the piecewise smooth fitting curve that are not segments corresponding to sharp angles of the contour.

10. The method of claim 9, wherein the root-mean square deviation is minimized using a banded matrix corresponding to a system of linear equations.

11. The method of claim 1, further comprising:
applying perspective, color, brightness and contrast correction to the raster image; and
building a binary black-white representation of the raster image prior to detecting the contour of the component.

12. An electronic device, comprising:
one or more processors; and
memory having instructions stored thereon, which when executed by the one or more processors cause the electronic device to perform:
detecting a contour of a component in a raster image;
building tangent vectors for a plurality of individual points of the contour;
identifying a plurality of segmentation points on the contour, the plurality of segmentation points including two first segmentation points, including:
identifying a location of high curvature in accordance with a determination that a change of direction of the tangent vectors associated with the location of high curvature exceed a first predefined threshold; and
positioning two first segments proximal to the location of high curvature for connecting the location of high curvature to the two first segmentation points on the contour;
approximating a piecewise smooth fitting curve to connect the plurality of segmentation points on the contour, the piecewise smooth fitting curve including two or more fitting segments each of which is configured to connect two neighboring points of the plurality of segmentation points; and in accordance with the piecewise smooth fitting curve, providing a vectorization of the raster image.

13. The electronic device of claim 12, wherein the first predefined threshold corresponds to an angle between a left tangent vector and a right tangent vector being less than ninety degrees.

14. The electronic device of claim 12, wherein the electronic device is a mobile device, and the raster image is captured and vectorized using the mobile device.

15. The electronic device of claim 12, wherein the plurality of segmentation points including one or more second segmentation points, and identifying the plurality of segmentation points on the contour further comprises:
   identifying one or more points of sharp angle on the contour in accordance with a determination that each of the one or more points of sharp angle has two distinct left and right tangent vectors originating from the respective point of sharp angle and that an angle between the two distinct left and right tangent vectors of each of the one or more points of sharp angle falls below a second predefined threshold; and
   positioning a respective one of the one or more second segmentation points at each identified point of sharp angle, each point of sharp angle connecting two second segments on the contour.

16. The electronic device of claim 15, wherein continuity of the tangent vectors for the contour is broken at each of the one or more points of sharp angle.

17. A non-transitory computer-readable medium, having one or more programs stored thereon, which when executed by one or more processors of an electronic device, cause the electronic device to perform operations for vectorizing a raster image, the one or more programs further comprising instructions for:
   detecting a contour of a component in the raster image;
   building tangent vectors for a plurality of individual points of the contour;
   identifying a plurality of segmentation points on the contour, the plurality of segmentation points including two first segmentation points, including:
      identifying a location of high curvature in accordance with a determination that a change of direction of the tangent vectors associated with the location of high curvature exceed a first predefined threshold; and
      positioning two first segments proximal to the location of high curvature for connecting the location of high curvature to the two first segmentation points on the contour;
   approximating a piecewise smooth fitting curve to connect the plurality of segmentation points on the contour, the piecewise smooth fitting curve including two or more fitting segments each of which is configured to connect two neighboring points of the plurality of segmentation points; and
   in accordance with the piecewise smooth fitting curve, providing a vectorization of the raster image.

18. The non-transitory computer-readable medium of claim 17, further comprising:
   in accordance with a determination that the piecewise smooth fitting curve does not match the contour, adding one or more segmentation points to create additional segments.

19. The non-transitory computer-readable medium of claim 17, further comprising:
   determining that the piecewise smooth fitting curve does not match the contour in accordance with a determination that a deviation of the piecewise smooth fitting curve from the contour exceeds a predefined deviation threshold.

20. The non-transitory computer-readable medium of claim 17, wherein the first predefined threshold corresponds to an angle between two tangent vectors of points on each location of high curvature that are twenty pixels apart, the angle being greater than 90 degrees.

* * * * *